May 22, 1956 H. H. TODD ET AL 2,746,637
ABRASION RESISTANT LINER
Filed Sept. 17, 1952
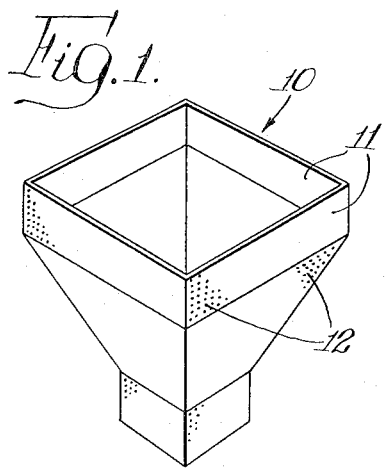
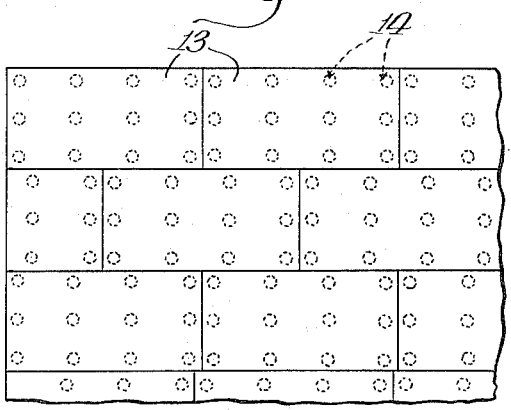
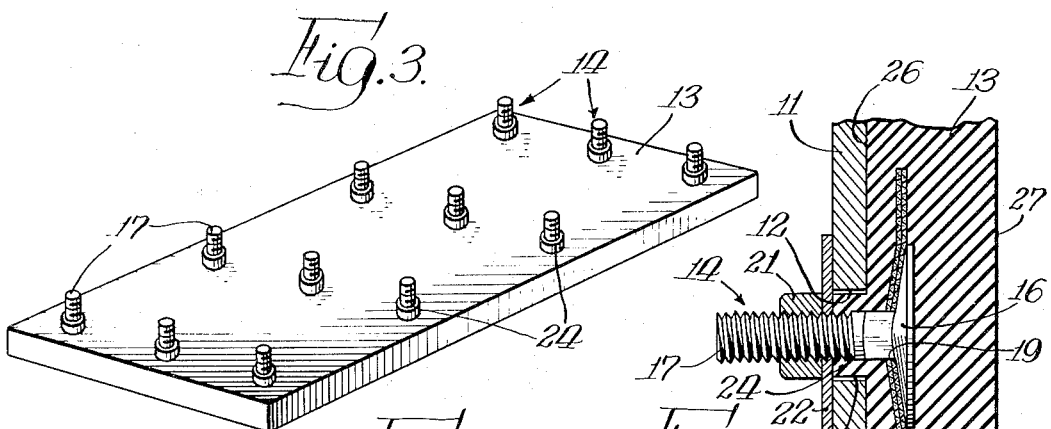
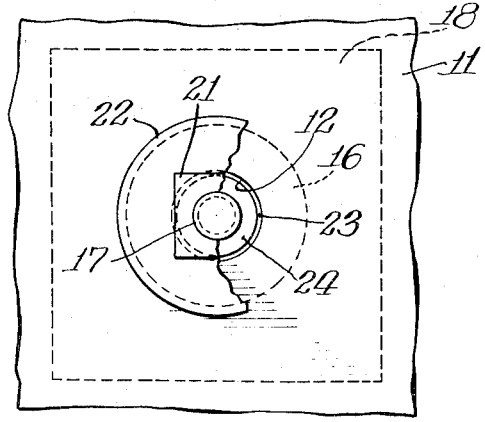
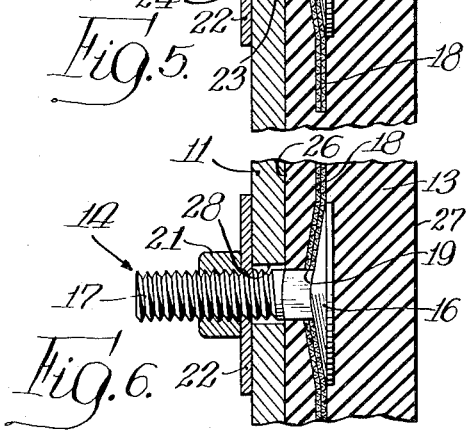
INVENTORS.
Hobart H. Todd,
Paul C. Whitney,
BY
Davis Lindsey Hibben + Noyes
Attys.

United States Patent Office 2,746,637
Patented May 22, 1956

2,746,637
ABRASION RESISTANT LINER

Hobart H. Todd, Oak Park, and Paul C. Whitney, Chicago, Ill., assignors to Robert P. Whitney, Chicago, Ill.

Application September 17, 1952, Serial No. 310,102

12 Claims. (Cl. 220—63)

This invention relates to improvements in the lining of heavy duty containers, conduits, and the like, adapted to contain a moving body of abrasive material, such as coke, gravel, sand, shot material, etc.

It has long been known that rubber is a highly satisfactory abrasion resistant material which would be useful for lining chutes, bins, hoppers, troughs, and like metallic structures designed to handle moving or flowing abrasive materials which tend to cause severe erosion of the metal. For example, it would be highly desirable to provide rubber linings for coke hoppers of the type used to introduce a measured quantity of coke into a blast furnace or the like.

However, the only manner of adhering rubber to metal which has heretofore been given any serious consideration has involved the use of metal having rubber vulcanized directly thereto so that a firm rubber-metal bond is developed.

Obviously, the vulcanization technique is expensive and inconvenient in that it requires specialized vulcanizing equipment, materials, and skill. Moreover, there is a definite limitation on the thickness of rubber which can be successfully adhered to metal by vulcanization. It would be highly desirable to employ rubber linings of substantial thickness in order to provide a liner of longer life, decreased rate of wear, and overall superior wearing qualities, but prior to our invention no practical method of securing thick heavy duty rubber liners has been evolved. In fact, it has frequently been considered necessary to resort to the use of expensive alloy steels in order to minimize abrasion and wear.

Accordingly, a primary object of our invention is to provide novel means for lining various structures with rubber having a greater thickness than has heretofore been possible.

An additional object of the invention is to provide a rubber liner of the character described having novel mechanical means for mounting the liner in sections on the walls of a structure to be protected.

A further object of the invention is to provide novel means for securing rubber liners to metal walls by the use of threaded fasteners such as bolts or the like.

Another object of the invention is to provide novel means for utilizing bolts or the like in attaching rubber liners to the metal walls of a structure adapted to contain a moving abrasive material whereby the bolts are not subjected to contact with the abrasive material.

Still another object of the invention is to provide novel means for utilizing bolts or the like in attaching rubber liners to the metal walls of a structure adapted to contain a moving abrasive material whereby slight inaccuracies in the spacing of the bolt holes can be compensated for and whereby the bolts are protected from the detrimental effects of vibrations in the structure being lined.

Other objects and advantages of the invention will become evident from the subsequent detailed description taken in conjunction with the accompanying drawing, wherein Fig. 1 is a perspective view on a reduced scale of a typical structure to which the lining of the present invention may be applied;

Fig. 2 is a fragmentary elevational view on an enlarged scale showing the interior of a portion of the structure illustrated in Fig. 1 as it would look with the lining applied thereto;

Fig. 3 is a perspective view illustrating a section of rubber liner constituting one specific embodiment of our invention, the liner being shown prior to application to the structure;

Fig. 4 is a fragmentary plan view on an enlarged scale of a portion of the liner as applied to the wall of a structure;

Fig. 5 is a cross-sectional view taken along the line 5—5 of Fig. 4; and

Fig. 6 is a view similar to Fig. 5 but showing a modified embodiment of the invention.

Referring to the drawing, we have shown in Fig. 1 merely by way of illustration a simplified hopper construction such as might be used in directing the flow of coke or similar abrasive material to a blast furnace or the like. The hopper, designated generally at 10, has the usual metal walls 11, and in this case the walls 11 are provided with a plurality of holes or apertures 12 having a predetermined spaced arrangement and distributed over all of the walls of the hopper.

One unit of the sectional liner which constitutes the principal feature of our invention is illustrated in Fig. 3 and consists of a rubber sheet or slab 13 having a predetermined thickness and shape. The rubber sheet 13 has mounted therein a plurality of bolts, indicated generally at 14. As will be best seen in Fig. 5, each bolt 14 has an enlarged relatively thin flattened head portion 16 and an elongated threaded shank portion 17. The bolts 14 are positioned in the rubber sheet 13 during casting or molding of the latter so that the head portions 16 are completely embedded in and surrounded by the rubber. During vulcanization or curing of the sheet, the rubber is vulcanized directly to the portions of the bolts embedded therein. The threaded shanks 17 of the bolts extend outwardly from the rubber sheet 13 at right angles thereto and in parallel relation with each other. Thus, the bolts 14 constitute permanent fastening members embedded in the rubber sheet 13 and forming a unitary article therewith.

The diameter of the head portion 16 of each bolt is preferably several times the diameter of the shank portion 17 in order to provide strong resistance to axial forces tending to pull the bolt from embedded relation in the rubber sheet 13. For example, in the embodiment shown the diameter of the bolt head 16 is between three and four times the diameter of the bolt shank 17. In order to assist retention of the bolts in the rubber sheet, we also provide reinforcing elements around the head of each bolt and embedded in the rubber sheet 13. In this case, the reinforcing elements constitute separate squares 18 of a heavy double ply fabric, such as duck or canvas. The squares 18 are apertured, as at 19, to permit the bolt shanks 17 to extend therethrough and are fitted closely around the head portions 16 of the bolts. The reinforcing squares 18 are also of substantially greater size than the diameter of the bolt head 16 whereby to provide the desired reinforcing and retaining effect.

As will be readily understood from the drawing, the structure such as the hopper 10 is lined by means of a plurality of liner sections 13 disposed in edgewise abutment and carrying the embedded bolts or fastening elements 14. Each rubber section 13 has a predetermined size and shape so that the separate sections can be fitted together to cover the entire inner surface of the metal walls 11 of the structure as seen in Fig. 2. As will be evident, the liner sections 13 are disposed against the inner wall surfaces with the projecting shanks 17 of the bolts 14 extending through the bolt holes 12 to the exterior of the walls 11. The individual liner sections 13 are then secured in place by means of threaded retainers or nuts 21 and washers 22.

It will be understood that proper installation of the liner sections requires that the bolt holes 12 in the structure being lined be drilled in substantially the same spaced relation as the spacing and arrangement of the bolts 14 in the individual liner sections 13. This can be readily accomplished by means of a template or similar device for locating the bolt holes 12. However, it is not always possible to locate the bolt holes 12 with the precision necessary for an exact fit. Moreover, slight discrepancies in the spacing of the bolts 14 can occur during the manufacture of the liner units 13. It will also be appreciated that if the bolt holes 12 are made just large enough to accommodate the bolt shanks 17, a high degree of accuracy is necessary in the matching of the bolts 14 with the holes 12.

In order to avoid the necessity for such extreme accuracy, in the preferred form of the invention as illustrated in Figs. 3, 4, and 5, we provide bolt holes 12 which are substantially larger than the diameter of the bolt shanks 17 so that an annular space 23 is provided between each bolt and the edges of its apertures 12 when the liner unit is in place. For filling these annular spaces 23, we provide a plurality of rubber bushings or collars 24 which are integral with the rubber sheet 13 and surround each bolt shank 17 adjacent the base or inner end thereof. The diameter of the rubber collar portion 24 is slightly less than the diameter of the aperture 12 so that the collars 24 are readily received in the bolt holes during installation of the lining. The collars 24, being made of rubber, are resilient or compressible so that in the event of slight inaccuracies in the spacing between the bolt holes 12 or between the bolts 14, the collars 24 will yield sufficiently to permit the liner section 13 to be pressed into proper position against the inner surface of the wall.

As seen in Fig. 5, the axial height of the rubber collar 24 may be substantially the same as the thickness of the wall 11, and when the nut 21 is drawn up loosely on the threaded shank 17 a small portion of the annular clearance 23 will still exist in most cases between the collar 24 and the edge of the aperture 12. However, it will be seen that upon tightening of the nut 21, there will be a tendency to draw the bolt 14 outwardly. Inasmuch as the rubber material surrounding the bolt head 16 has a certain degree of resiliency, this material will yield slightly in order to permit a small degree of outward axial shifting of the bolt 14 with a consequent tendency to force the collar 24 outwardly from the main body of the sheet 13. As a result of such slight yielding of the rubber material, it will be seen that the rubber collar 24 is subjected to increasing axial compression as the nut 21 is tightened further, and such axial compression is sufficient to expand the collar portion 24 radially and thereby fill up the entire clearance space 23 for providing a snug fit within the bolt holes 12. Such axial compression and radial expansion of the rubber collars 24 can be further facilitated, if desired, by making the axial height of the collar portions 24 slightly greater than the thickness of the metal wall 11.

In addition to this effect of the collars 24 in compensating for slight inaccuracies in the size and spacing of the bolt holes 12, it will be seen that the collars 24 also provide an important cushioning effect which completely prevents contact between the bolt shanks 17 and the metal walls 11. Thus, during use of the hopper or other structure, detrimental vibrations from the hopper wall are not transmitted to the bolt shanks to any harmful extent and consequently the bolts 14 are protected from shearing impact and undue wear.

A further advantage of our invention resides in the fact that the bolt heads 16 can be positioned closely adjacent the inner or unexposed surface of the liner sections 13, i. e. the surface in contact with the metal wall 11 as indicated at 26 in Fig. 5. By thus positioning the bolt heads 16 as closely as possible to the inner surface 26 of the liner, it will be evident that we afford a maximum thickness of rubber between the bolt heads 16 and the outer liner surface, indicated at 27 in Fig. 5, which is subjected to contact with the abrasive material. In other words, the entire thickness of rubber between the outer or exposed surface 27 and the bolt heads 16 can be worn through before the life of the liner is terminated. By means of the present invention, the liner sections 13 may have substantially greater thickness than was heretofore possible by vulcanizing a rubber liner directly to the metal. For example, rubber sections having a thickness of 1 inch or even more can be readily installed.

The integral rubber collars 24 may contribute materially to the ability to locate the bolt heads 16 closely adjacent the inner surfaces 26 of the liners by reason of the stabilizing effect of the collars 24 on the bolt shanks. Thus, a minimum quantity of rubber material in the main body of the rubber sheet 13 may surround the head portions 16 of the bolts since the external rubber collars 24 are in tight-fitting embedded relation around the projecting bolt shanks 17 and thereby serve to retain the latter in stable parallel relation while at the same time permitting the bolt heads 16 to be embedded closely adjacent the inner surface 26 of the rubber liner 13.

Although the provision of the rubber collars 24 greatly facilitates the practical use of our invention for the reasons described above, there will no doubt be occasions when a high degree of accuracy can be readily obtained in forming the bolt holes and where the need for protecting the bolts against vibration and shock is not so great. Under such circumstances, we may omit the collar portions 24 as illustrated in Fig. 6. In this instance the bolt holes, indicated at 28, will be only slightly greater than the diameter of the bolt shanks in order to permit retention of the liner sections with a minimum degree of slippage or play between the bolt shanks and the bolt holes. In addition, upon tightening of the nuts 21 in the Fig. 6 embodiment, a portion of the rubber sheet 13 adjacent the inner surface 26 thereof will tend to be forced outwardly into the annulus between the bolt shanks and the edges of the holes 28 whereby to provide a limited cushioning effect generally similar to the function of the preformed collars 24 as previously described.

From the foregoing it will be evident that our invention provides a relatively simple and highly effective means for lining large containers and other metal structures with rubber in the substantial thicknesses required for heavy duty purposes. The invention provides for the first time a commercially practical rubber liner which is adapted to meet a wide variety of abrasion conditions. By reason of the sectional nature of the lining, each liner unit can be preformed to any desired size and shape to meet the requirements of a particular job. Furthermore, if wear occurs in any particular area of the lined structure, it is necessary to replace only one or a few liner units rather than the entire rubber lining thereby greatly facilitating proper maintenance and reducing the cost thereof.

Although the invention has been described in conjunction with certain specific embodiments thereof, it will be understood that various modifications and equivalent structures may be resorted to without departing from the scope of the invention as defined in the appended claims.

We claim:

1. A liner of the character described comprising a rubber slab of substantial thickness, a plurality of headed fasteners having head portions embedded in said slab and elongated shank portions extending transversely from the plane of the slab, and flexible reinforcing sheet means embedded in said slab around said head portions for assisting retention of the fasteners in the slab with said shank portions extending through said reinforcing sheet means, the rubber of said slab completely surrounding and being vulcanized to said head portions and also to said reinforcing sheet means whereby said fasteners and said reinforcing sheet means are firmly and permanently mounted in said slab, and said fasteners being disposed in predetermined spaced relation and being adapted to extend through similarly spaced apertures in a supporting structure for securing the liner to said structure.

2. A liner of the character described comprising a section of rubber having a substantial thickness and a predetermined shape for covering a selected portion of the inner surface of a structure adapted to contain moving abrasive material, one face of said rubber section being adapted to be disposed against the inner surface of the structure and the opposite face of said rubber section being adapted to contact the abrasive material, a plurality of elongated fastening elements mounted in said rubber section in predetermined spaced relation, said fastening elements having enlarged head portions embedded in said rubber section in closer proximity to said one face than said other face whereby to provide a substantial thickness of rubber between said head portions and said opposite face of said section, said fastening elements also comprising elongated shank portions extending outwardly from said one face of said section and adapted to project through similarly spaced apertures provided in the supporting structure for securing the liner thereto, and flexible reinforcing sheet means embedded in said section between said head portions and said one face of the section for assisting retention of the fastening elements in the section with said shank portions extending through said reinforcing sheet means, the rubber of said section completely surrounding and being vulcanized to said head portions and also to said reinforcing sheet means whereby said fastening elements and said reinforcing sheet means are firmly and permanently mounted in said section.

3. A liner of the character described comprising a rubber sheet of predetermined thickness and peripheral shape, a plurality of fastening elements having enlarged head portions embedded in said sheet and elongated shank portions projecting outwardly from the sheet in spaced relation for mounting the sheet on a surface to be lined, and apertured flexible reinforcing means embedded in said sheet and disposed adjacent the head portions of said fastening elements with said shank portions extending therethrough, said reinforcing means being of greater lateral dimensions than said head portions whereby to assist in retaining the latter in embedded position in said sheet, and the rubber of said sheet completely surrounding and being vulcanized to said head portions and also to said reinforcing means whereby said fastening elements and said reinforcing means are firmly and permanently mounted in said sheet.

4. The article of claim 3 further characterized in that said reinforcing means comprises a multiply fabric.

5. A liner of the character described comprising a rubber sheet of predetermined thickness and shape, a plurality of bolts having enlarged head portions embedded in the sheet and elongated threaded shanks extending outwardly from the sheet in predetermined spaced relation, apertured flexible reinforcing means embedded in said sheet around said head portions for assisting retention of the bolts in the sheet with said shanks extending through said reinforcing means, the rubber of said sheet completely surrounding and being vulcanized to said head portions and also to said reinforcing means whereby said bolts and said reinforcing means are firmly and permanently mounted in said sheet, and a plurality of annular rubber bushings integrally connected to said sheet and extending outwardly therefrom around said shanks adjacent the inner ends thereof, said shanks being adapted to extend through a plurality of complementary enlarged apertures in the wall of a structure to be lined whereby threaded retaining elements can be screwed onto the projecting portions of said shanks for securing the liner in place, and said bushings being adapted to fit into the enlarged apertures for preventing direct contact between the bolts and the wall and said bushings being radially expansible upon tightening of the retaining elements whereby to fill up the apertures and provide a snug resilient fit therein.

6. The article of claim 5 further characterized in that the portions of said rubber sheet around the head portions of said bolts are adapted to yield slightly upon tightening of the retaining elements whereby to permit slight axial shifting of the bolts and said bushings to facilitate axial compression and radial expansion of the latter.

7. In combination, a wall adapted to support a moving body of abrasive material, said wall having a plurality of apertures in predetermined spaced relation, an abrasion resistant liner comprising an imperforate rubber slab of predetermined thickness and shape disposed against the inner surface of the wall, a plurality of elongated fastening elements having enlarged head portions embedded in said slab and elongated threaded shank portions extending outwardly from said slab through said apertures, flexible reinforcing sheet means embedded in said slab around said head portions for assisting retention of the fastening elements in the slab with said shank portions extending through said reinforcing sheet means, the rubber of said slab completely surrounding and being vulcanized to said head portions and also to said reinforcing means whereby said fastening elements and said reinforcing means are firmly and permanently mounted in said slab, and threaded retainers screwed on the projecting ends of said shank portions at the outer surface of said wall for securing the liner on said wall.

8. In combination, a wall adapted to support a moving body of abrasive material, said wall having a plurality of apertures in predetermined spaced relation, an abrasion resistant liner comprising an imperforate rubber slab of predetermined thickness and shape having one face thereof disposed against the inner surface of said wall and the opposite face thereof adapted to contact the abrasive material, and a plurality of elongated fastening elements mounted in said rubber slab and extending outwardly through said apertures for securing the liner on the wall, said fastening elements having enlarged head portions embedded in said slab and completely surrounded by rubber and flexible reinforcing sheet means embedded in said slab between said head portions and said one face of said slab for assisting retention of the fastening elements in said slab with the fastening elements extending through said sheet means, the rubber of said slab being vulcanized to said head portions and also to said reinforcing sheet means whereby said fastening elements and said reinforcing sheet means are firmly and permanently mounted in said slab, and said head portions being disposed in close proximity to said one face of said slab whereby to provide a substantial thickness of rubber between said head portions and the opposite face of said slab for maximum wearing life of the liner.

9. In combination, a wall adapted to support a moving body of abrasive material, said wall having a plurality of apertures in predetermined spaced relation, an abrasion resistant liner comprising an imperforate rubber sheet of predetermined thickness and shape disposed against the inner surface of the wall, a plurality of elongated fastening elements mounted in said rubber sheet in substantially the same predetermined spaced relation as said apertures and extending outwardly through the latter for securing the liner on the wall, and a plurality of annular rubber collars integral with said sheet and extending outwardly therefrom around said fastening elements, said collars being received within said apertures along substantially the full axial distance of the apertures in resilient cushioning relation between said fastening elements and the edge portions of the wall around said apertures whereby to compensate for slight inaccuracies between the spacings of said apertures and said fastening elements and whereby said fastening elements are resiliently cushioned and protected from the effect of vibrations in said wall.

10. In combination, a wall adapted to support a moving body of abrasive material, said wall having a plurality of apertures in predetermined spaced relation, an abrasion resistant liner comprising an imperforate rubber sheet of predetermined thickness and shape disposed against the inner surface of the wall, a plurality of bolts having enlarged head portions embedded in said sheet and threaded shank portions extending outwardly through said apertures, a plurality of nuts threaded onto the projecting ends of said shank portions at the exterior of the wall for securing the liner in place, and a plurality of rubber collars integral with said sheet and extending outwardly therefrom around the shank portions of the bolts, said apertures having a slightly larger diameter than the normal diameter of said collars to permit said collars to be readily received in said apertures in resilient cushioning relation around the bolts, and said collars having an axial length substantially coextensive with the thickness of said wall and being radially expansible upon tightening of said nuts whereby to fill up said apertures and provide a snug resilient fit therein.

11. The combination of claim 10 further characterized in that said radial expansion of the collars is effected by slight yielding of the portions of the rubber sheet surrounding the head portions of the bolts upon tightening of the nuts whereby to permit slight axial shifting of the bolts and collars to facilitate axial compression and radial expansion of the latter.

12. In a structure having walls adapted to contain a moving body of abrasive material, an abrasion resistant lining comprising a plurality of rubber sections each having a predetermined thickness and shape and disposed in edgewise abutment against the inner surfaces of said walls for covering the latter, and means for fastening said sections to the walls comprising a plurality of elongated fastening elements having enlarged head portions embedded in each of said sections and elongated threaded shank portions extending outwardly therefrom in predetermined spaced relation, said walls having apertures therethrough in substantially the same spaced relation for permitting said shank portions to extend through the walls, flexible reinforcing sheet means embedded in said sections around said head portions for assisting retention of the fastening elements in said sections with the shank portions extending through said sheet means, the rubber of each of said sections completely surrounding and being vulcanized to the head portions of the fastening elements therein and also to the adjacent reinforcing means whereby said fastening elements and said reinforcing means are permanently mounted in said sections, and threaded retainer elements screwed on the projecting ends of said shank portions at the exterior of said walls for securing the rubber sections in place.

References Cited in the file of this patent
UNITED STATES PATENTS

| | | |
|---|---|---|
| 1,419,395 | McKenzie | June 13, 1922 |
| 1,975,071 | Black | Oct. 2, 1934 |
| 2,083,491 | Chaffee | June 8, 1937 |
| 2,209,403 | Kittner et al. | July 30, 1940 |
| 2,227,905 | Keenoy | Jan. 7, 1941 |
| 2,401,627 | Eger | June 4, 1946 |
| 2,639,832 | Bergstrom | May 26, 1953 |